United States Patent [19]
Jennings et al.

[11] Patent Number: 4,870,812
[45] Date of Patent: Oct. 3, 1989

[54] ROUND BALER WITH VARIABLE BALE CHAMBER

[75] Inventors: Richard E. Jennings, Manheim; Wilburn H. Potter, Strasburg; Shaun A. Seymour, New Holland, all of Pa.

[73] Assignee: Ford New Holland, Inc., New Holland, Pa.

[21] Appl. No.: 186,984

[22] Filed: Apr. 27, 1988

[51] Int. Cl.⁴ .............................................. A01D 39/00
[52] U.S. Cl. ......................................... 56/341; 100/88
[58] Field of Search .............................. 56/341; 100/83

[56] References Cited

U.S. PATENT DOCUMENTS

| | | | |
|---|---|---|---|
| 4,262,478 | 4/1981 | Pentith | 56/341 |
| 4,321,787 | 3/1982 | Holdeman et al. | 56/341 |
| 4,330,985 | 5/1982 | Shindelar | 56/341 |
| 4,422,373 | 12/1973 | Goeddert | 56/341 |
| 4,446,684 | 5/1984 | Frimml et al. | 56/341 |
| 4,549,480 | 10/1985 | DeCoene | 56/341 |
| 4,566,379 | 1/1986 | DeCoene | 56/341 |
| 4,597,249 | 7/1986 | Bowden, Jr. | 56/341 |
| 4,633,659 | 1/1967 | Ansley et al. | 56/341 |
| 4,643,239 | 3/1987 | Geiser et al. | 56/341 |
| 4,669,257 | 6/1987 | Rossato et al. | 56/341 |
| 4,698,955 | 10/1987 | Wagstaff | 56/341 |
| 4,759,279 | 7/1988 | Frerich | 100/88 |
| 4,763,464 | 8/1988 | Movret | 56/341 |

Primary Examiner—Paul J. Hirsch
Attorney, Agent, or Firm—Darrell F. Marquette; Frank A. Seemar; Larry W. Miller

[57] ABSTRACT

A round baler includes an apron having an expandable inner course which cooperates with a sledge assembly to define a bale starting chamber when the sledge assembly is in a bale starting position. The sledge assembly is movable between the bale starting position and a full bale position. The sledge assembly includes a plurality of rollers and an idler roller in engagement with the apron to maintain the apron in close proximity to one of the rollers during movement of the sledge assembly between the bale starting and full bale positions.

7 Claims, 2 Drawing Sheets

ROUND BALER WITH VARIABLE BALE CHAMBER

BACKGROUND OF THE INVENTION

This invention relates generally to agricultural balers and, in particular, to such balers typically referred to as "round balers" which form cylindrical bales of crop material.

Three basic types of bale forming elements have been used in round balers. These are chain and slat aprons, belt aprons and rollers. Each type of bale forming element has advantages and disadvantages. For example, an advantage of chain and slat aprons is that they are capable of starting bales in almost all crop conditions but a disadvantage of these aprons is that they often form bales with rough outer surfaces. An advantage of belt aprons is that they form bales with smooth outer surfaces but a disadvantage of belt aprons is that they have bale starting problems in certain crop conditions. Rollers also have the advantage of forming bales with smooth outer surfaces but they have a disadvantage of resulting in losses of crop material through the gaps between adjacent rollers.

Copending U.S. patent application Ser. No. 063,390 of Richard E. Jennings, filed June 18, 1987 now U.S. Pat. No. 4,771,595 granted Sept. 20, 1988 and assigned to the same Assignee as this application, discloses a round baler utilizing a combination of bale forming rollers and a belt apron. In the disclosed round baler, the rollers are fixed and cooperate with the belt apron to define a generally D-shaped bale starting chamber. The fixed rollers form a front wall of the starting chamber, and the belt apron has an expandable course that forms a rear wall of the starting chamber. While the round baler disclosed in U.S. patent application Ser. No. 063,390 functions adequately in hay and when making full size bales, it encounters problems operating in straw and silage and when making less than full size bales. For example, the D-shaped starting chamber results in the generation of fines and causes the less than full size bales to be out-of-round and have lower than desirable density and poor appearance.

It is an object of the present invention to provide a round baler which incorporates as many advantages as possible of the three basic types of bale forming elements while minimizing the disadvantages thereof.

It is another object of the present invention to provide a round baler which overcomes the aforementioned problems encountered by the round baler disclosed in U.S. patent application Ser. No. 063,390.

SUMMARY OF THE INVENTION

The present invention provides a round baler including a main frame, a tailgate pivotally connected to the main frame, a sledge assembly mounted on the main frame for movement between a bale starting position and a full bale position, and an apron movably supported on the main frame and the tailgate. The apron has an expandable inner course which cooperates with the sledge assembly to define a bale starting chamber when the sledge assembly is in its bale starting position.

In the preferred embodiment of the round baler, the sledge assembly comprises a plurality of rollers which cooperate with the apron inner course to define the bale starting chamber. The sledge assembly also comprises idler means engaging the apron for maintaining the apron in close proximity to one roller of the plurality of rollers during movement of the sledge assembly between the bale starting and full bale positions. The apron inner course forms a rear wall of the bale starting chamber and the plurality of rollers forms a front wall of the bale starting chamber. The apron may comprise a plurality of belts supported on guide rolls which are rotatably mounted in the tailgate and on a drive roll which is rotatably mounted in the main frame.

DESCRIPTION OF THE PREFERRED EMBODIMENT

Figure 1:
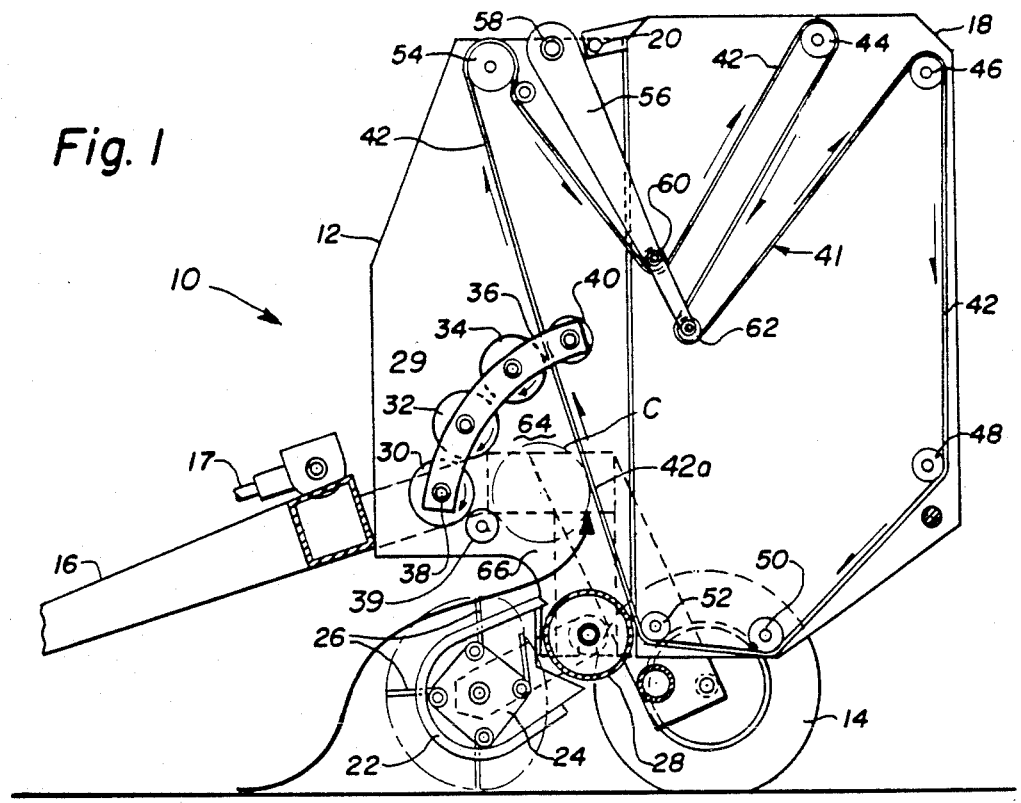
FIG. 1 is a side elevational view of a round baler according to the preferred embodiment of the present invention at the start of bale formation.
Figure 2:
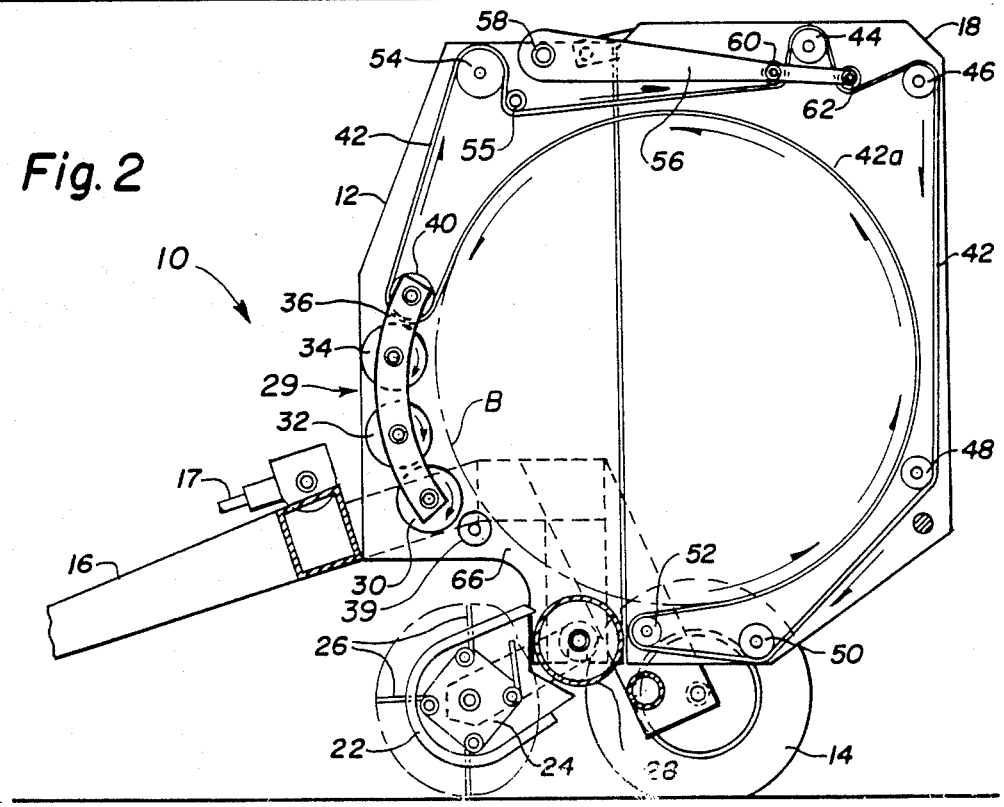
FIG. 2 is another side elevational view of the round baler of FIG. 1 at the completion of bale formation.
Figure 3:
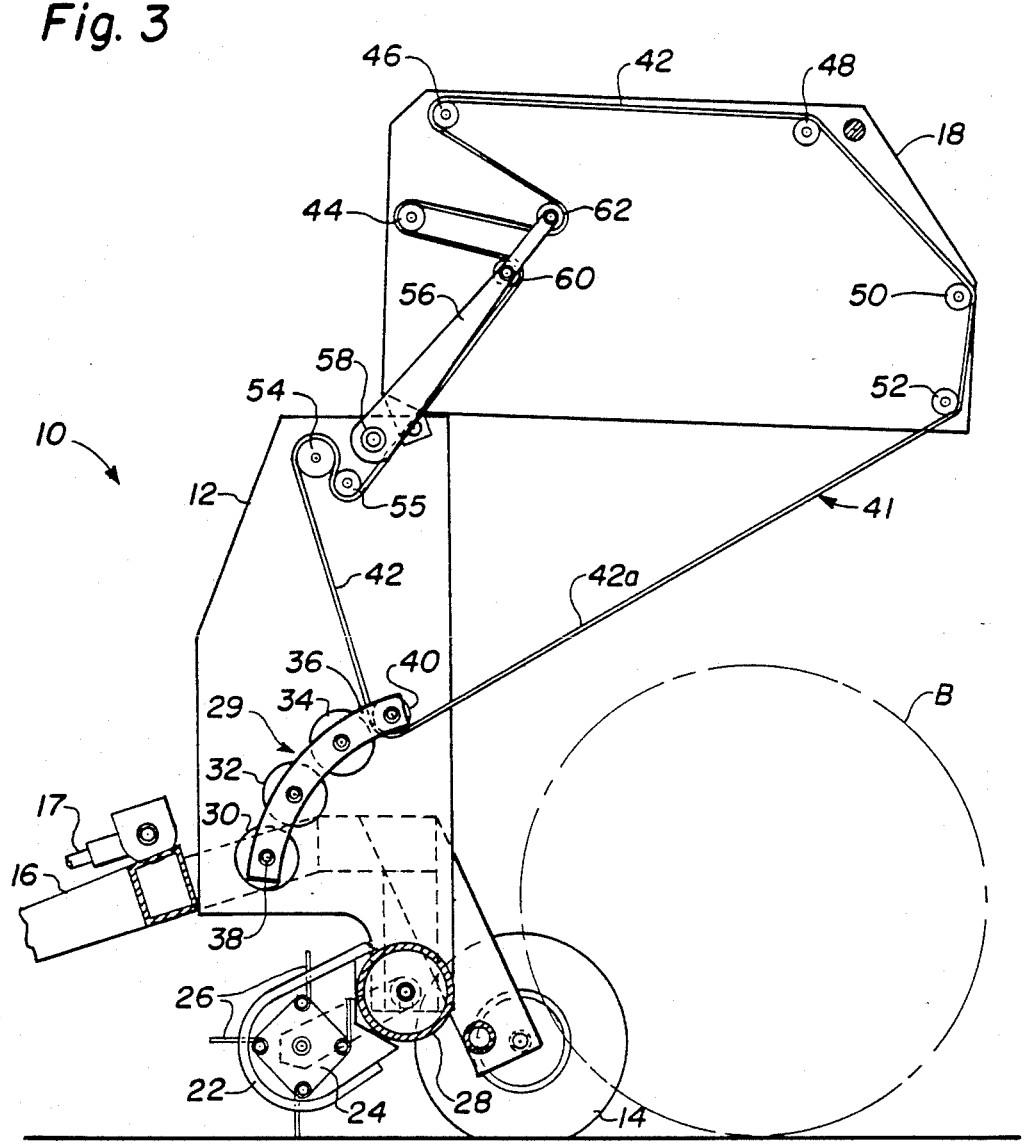
FIG. 3 is a further side elevational view of the round baler of FIG. 1 during bale ejection.

Referring to FIGS. 1 and 2, a round baler 10 according to the preferred embodiment of the present invention includes a main frame 12 supported by a pair of wheels 14. A tongue 16 is provided on the forward portion of the main frame 12 for connection to a tractor (not shown). A tailgate 18 is pivotally connected to the main frame 12 by stub shafts 20 so that the tailgate 18 may be closed as shown in FIG. 1 and opened as shown in FIG. 3. A conventional pickup 22 is mounted on the main frame 12 by a pair of brackets 24 and is supported by a pair of wheels (not shown). The pickup 22 includes a plurality of fingers or tines 26 movable in a predetermined path to lift crop material from the ground and deliver it rearwardly toward a floor roll 28 which is rotatably mounted on the main frame 12.

In accordance with the present invention, a sledge assembly 29 includes a plurality of rollers 30, 32, 34 extending transversely of the main frame 12 in an arcuate arrangement and journalled at the ends thereof in a pair of arcuately shaped arms 36. The arms 36 are pivotally mounted inside the main frame 12 on stub shafts 38 for permitting movement of the sledge assembly 29 between a bale starting position shown in FIG. 1 and a full bale position shown in FIG. 2. The rollers 30, 32, 34 are driven in a clockwise direction as indicated in FIG. 1 by conventional means (for example, chains and sprockets or gears) connected with a drive shaft 17 which is adapted for connection to the PTO of a tractor (not shown). A stripper roll 39 is located adjacent roller 30 and is driven in a clockwise direction, as viewed in FIG. 1, to strip crop material from the roller 30. An idler roller 40 is carried by the arms 36 for movement in an arcuate path when the sledge assembly 29 moves between its bale starting and full bale positions. The idler roller 40 is freely rotatable.

An apron 41 includes a plurality of belts 42 supported on guide rolls 44, 46, 48, 50, 52 which are rotatably mounted in the tailgate 18 and on a drive roll 54 which is rotatably mounted in the main frame 12. Although the belts 42 pass between the roller 34 and the idler roller 40, they are in engagement with only the idler roller 40 but the roller 34 is located in close proximity to the belts 42 to strip crop material from the belts 42. Further conventional means (not shown) are connected with the drive shaft 17 to provide rotation of the drive roll 54 in a direction which causes movement of the belts 42 along the path indicated in FIG. 1 when starting a bale. An additional guide roll 55 in the main frame 12 ensures proper driving engagement between the belts 42 and the drive roll 54. Another pair of arms 56 are pivotally mounted on the main frame 12 by a cross shaft 58 for movement between inner and outer positions shown in FIGS. 1 and 2, respectively. Arms 56 carry additional guide rolls 60 and 62 for the belts 42. Resilient means (not shown) are provided to normally urge the arms 56 toward their inner positions while resisting movement thereof from their inner positions to their outer positions.

When the round baler 10 is in the condition shown in FIG. 1 with the tailgate 18 closed, an inner course 42a of the apron belts 42 extending between the guide roll 52 and the idler roller 40 cooperates with the rollers 30, 32, 34 of the sledge assembly 29 to define a bale starting chamber 64. The apron inner course 42a forms a rear wall of the chamber 64 while the rollers 30, 32, 34 form a front wall of the chamber 64. The floor roll 28 is disposed in the bottom of the chamber 64 between the front and rear walls thereof. The roller 30 is spaced from the floor roll 28 to form a throat or inlet 66 for the chamber 64, and the arms 56 will be urged into their inner positions shown in FIG. 1.

As the round baler 10 is towed across a field by a tractor (not shown), the pickup tines 26 lift crop material from the ground and feed it into the bale starting chamber 64 via the throat 66. The crop material is carried rearwardly by the floor roll 28 into engagement with the apron inner course 42a which carries it upwardly and forwardly into engagement with the rollers 30, 32, 34. The crop material is coiled in a counterclockwise direction as viewed in FIG. 1 to start a bale core C. Continued feeding of crop material into the chamber 64 by the pickup tines 26 causes the apron inner course 42a of the belts 42 to expand in length around a portion of the bale core C as the diameter thereof increases. The arms 56 rotate from their inner position shown in FIG. 1 toward their outer position shown in FIG. 2 to permit such expansion of the apron inner course 42a. When a full sized bale B has been formed and then wrapped with a suitable material such as twine or net, the tailgate 18 is opened by conventional means (for example, hydraulic cylinders) and the bale B is ejected as shown in FIG. 3. Subsequent closing of the tailgate 18 returns the apron inner course 42a to the location shown in FIG. 1 since the arms 56 are returned to their inner position shown in FIG. 1. The round baler 10 is now ready to form another bale.

It will be understood that during formation of the bale B, sledge assembly 29 moves from its bale starting position of FIG. 1 to its full bale position of FIG. 2. This movement of the sledge assembly 29 causes the idler roller 40 to move in an arcuate path while maintaining the apron belts 42 in close proximity to the roller 34, thereby allowing the roller 34 to strip crop material from the apron belts 42. The idler roller 40 thus prevents the loss of crop material between the roller 34 and the belts 42 during formation of the bale B. The sledge assembly 29 is pushed outwardly toward its full bale position during bale formation and is pulled inwardly toward its bale starting position during bale ejection without utilizing any additional mechanisms.

In an alternative embodiment of the round baler 10, apron 41 consists of a pair of chains connected together at spaced intervals by transverse slats, and the idler roller 40 is replaced by a pair of idler sprockets engaged with the chains. Also in this alternative embodiment, the guide rolls 44, 46, 48, 50, 52, 55, 60 and 62 would be replaced with guide sprockets for engaging the apron chains, and the drive roll 54 would be replaced with drive sprockets.

What is claimed is:

1. A round baler comprising:
   a main frame;
   a tailgate pivotally connected to said main frame;
   a sledge assembly mounted on said main frame for movement between a bale starting position and a full bale position, said sledge assembly including a plurality of rollers extending transversely of said main frame, said sledge assembly carrying idler means at one end thereof;
   an apron movably supported on a drive member which is rotatably mounted in said main frame and on a plurality of guide members which are rotatably mounted in said tailgate, said apron engaging said idler means and having an inner course extending between one of said plurality of guide members and said idler means while cooperating with said rollers of said sledge assembly to define a bale starting chamber when said sledge assembly is in said bale starting position;
   arm means carrying an additional guide member for supporting said apron, said arm means being movable between an inner position and an outer position as said sledge assembly moves between said bale starting and full bale positions, respectively;
   said idler means being located rearwardly of said drive member when said sledge assembly is in said bale starting position;
   said idler means and said additional guide member moving in substantially opposite directions relative to said one guide member upon movement of said sledge assembly from aid bale starting position toward said full bale position and upon movement of said arm means from said inner position toward said outer position; and
   said idler means being located forwardly of said drive member when said sledge assembly is in said full bale position.

2. The round baler of claim 1, wherein said idler means maintains said apron in close proximity to one roller of said plurality of rollers during movement of said sledge assembly between said bale starting and full bale positions.

3. The round baler of claim 2, wherein said apron passes between said idler means and said one roller.

4. The round baler of claim 3, wherein said apron comprises a plurality of belts supported on said guide members and on said drive member.

5. The round baler of claim 4, wherein said apron inner course forms a rear wall of said bale starting chamber and wherein said plurality of rollers forms a front wall of said bale starting chamber.

6. The round baler of claim 5, further comprising a floor roll rotatably mounted in said main frame and disposed adjacent said one guide member.

7. The round baler of claim 6 wherein said rollers of said sledge assembly are rotatably mounted and extend between a pair of arms, said arms being pivotally mounted on said main frame for permitting movement of said sledge assembly between said bale starting and full bale positions.

* * * * *